US009755668B2

(12) United States Patent
Mandegaran et al.

(10) Patent No.: US 9,755,668 B2
(45) Date of Patent: Sep. 5, 2017

(54) RADIO FREQUENCY COMPLEX REFLECTION COEFFICIENT READER

(71) Applicant: Abtum Inc., Irvine, CA (US)

(72) Inventors: Sam Mandegaran, Pasadena, CA (US); Hossein Hashemi, Pacific Palisades, CA (US)

(73) Assignee: Abtum Inc., Irvine, CA (US)

( * ) Notice: Subject to any disclaimer, the term of this patent is extended or adjusted under 35 U.S.C. 154(b) by 0 days.

(21) Appl. No.: 15/280,083

(22) Filed: Sep. 29, 2016

(65) Prior Publication Data

US 2017/0093441 A1 Mar. 30, 2017

Related U.S. Application Data

(60) Provisional application No. 62/235,020, filed on Sep. 30, 2015.

(51) Int. Cl.
*H04B 17/00* (2015.01)
*H04B 1/00* (2006.01)
*H04B 17/10* (2015.01)
*H04B 1/48* (2006.01)

(52) U.S. Cl.
CPC ............ *H04B 1/005* (2013.01); *H04B 1/48* (2013.01); *H04B 17/10* (2015.01)

(58) Field of Classification Search
CPC ........ H04B 1/06; H04B 17/10; H04B 17/101; H04B 17/102; H04B 17/103; H04B 17/11
See application file for complete search history.

(56) References Cited

U.S. PATENT DOCUMENTS

| 2,561,212 A | 7/1951 | Lewis |
| 3,025,463 A | 3/1962 | Luoma et al. |
| 3,453,638 A | 7/1969 | Hoovler |

(Continued)

FOREIGN PATENT DOCUMENTS

| DE | 102012107877 A1 | 2/2014 |
| EP | 1091497 A1 | 4/2001 |

(Continued)

OTHER PUBLICATIONS

EESR for European Appl. No. 13876497.2, dated Jul. 4, 2016.

(Continued)

*Primary Examiner* — Blane Jackson
(74) *Attorney, Agent, or Firm* — McAndrews, Held & Malloy, Ltd.

(57) ABSTRACT

A radio frequency (RF) circuitry includes a device that taps a transmission line and picks up some of electromagnetic signals traveling in both directions. The RF circuitry includes a first detector, a second detector, a third detector, and a processor. The first detector measures a power of a first portion of the tapped electromagnetic signal travelling in one direction. The second detector measures a power of a first portion of the tapped electromagnetic signal travelling in the other direction. The third detector measures a power of a combined signal which includes a second portion of the tapped electromagnetic signal travelling in the one direction and a second portion of the tapped electromagnetic signal travelling in the other direction. The processor determines, based on outputs from the detectors, a relative magnitude and a relative phase of the electromagnetic signals.

10 Claims, 8 Drawing Sheets

(56) References Cited

U.S. PATENT DOCUMENTS

| | | |
|---|---|---|
| 3,704,409 A | 11/1972 | Oomen |
| 3,800,218 A | 3/1974 | Shekel |
| 4,029,902 A | 6/1977 | Bell et al. |
| 4,146,851 A | 3/1979 | Dempsey et al. |
| 4,427,936 A | 1/1984 | Riblet et al. |
| 4,464,675 A | 8/1984 | Balaban et al. |
| 4,489,271 A | 12/1984 | Riblet |
| 4,694,266 A | 9/1987 | Wright |
| 4,721,901 A | 1/1988 | Ashley |
| 4,963,945 A | 10/1990 | Cooper et al. |
| 4,968,967 A | 11/1990 | Stove |
| 5,408,690 A | 4/1995 | Ishikawa et al. |
| 5,493,246 A | 2/1996 | Anderson |
| 5,525,945 A | 6/1996 | Chiappetta et al. |
| 5,574,400 A | 11/1996 | Fukuchi |
| 5,691,978 A | 11/1997 | Kenworthy |
| 5,781,084 A | 7/1998 | Rhodes |
| 6,178,310 B1 | 1/2001 | Jeong |
| 6,194,980 B1 | 2/2001 | Thon |
| 6,229,992 B1 | 5/2001 | McGeehan et al. |
| 6,262,637 B1 | 7/2001 | Bradley et al. |
| 6,297,711 B1 | 10/2001 | Seward et al. |
| 6,496,061 B1 | 12/2002 | Bloom |
| 6,721,544 B1 | 4/2004 | Franca-Neto |
| 6,819,302 B2 | 11/2004 | Volman |
| 7,072,614 B1 | 7/2006 | Kasperkovitz |
| 7,116,966 B2 | 10/2006 | Hattori et al. |
| 7,123,883 B2 | 10/2006 | Mages |
| 7,250,830 B2 | 7/2007 | Layne et al. |
| 7,330,500 B2 | 2/2008 | Kouki |
| 7,623,005 B2 | 11/2009 | Johansson et al. |
| 7,633,435 B2 | 12/2009 | Meharry et al. |
| 7,711,329 B2 | 5/2010 | Aparin et al. |
| 7,804,383 B2 | 9/2010 | Volatier et al. |
| 7,894,779 B2 | 2/2011 | Meiyappan et al. |
| 8,013,690 B2 | 9/2011 | Miyashiro |
| 8,135,348 B2 | 3/2012 | Aparin |
| 8,149,742 B1 | 4/2012 | Sorsby |
| 8,199,681 B2 | 6/2012 | Zinser et al. |
| 8,385,871 B2 | 2/2013 | Wyville |
| 8,422,412 B2 | 4/2013 | Hahn |
| 8,514,035 B2 | 8/2013 | Mikhemar et al. |
| 8,600,329 B1 | 12/2013 | Comeau et al. |
| 8,620,246 B2 * | 12/2013 | McKinzie ............... H03H 7/40 455/178.1 |
| 8,749,321 B2 | 6/2014 | Kim et al. |
| 8,761,026 B1 | 6/2014 | Berry et al. |
| 8,957,742 B2 * | 2/2015 | Spears .................. H03H 7/40 333/17.3 |
| 9,048,805 B2 | 6/2015 | Granger et al. |
| 9,214,718 B2 * | 12/2015 | Mow .................. H01Q 1/243 |
| 9,450,553 B2 * | 9/2016 | Langer ............... H03G 3/3042 |
| 9,490,866 B2 | 11/2016 | Goel et al. |
| 9,543,630 B2 | 1/2017 | Tokumitsu et al. |
| 9,590,794 B2 | 3/2017 | Analui et al. |
| 2002/0089396 A1 | 7/2002 | Noguchi et al. |
| 2003/0109077 A1 | 6/2003 | Kim et al. |
| 2004/0000425 A1 | 1/2004 | White et al. |
| 2004/0127178 A1 | 7/2004 | Kuffner |
| 2004/0180633 A1 | 9/2004 | Nakatani et al. |
| 2005/0070232 A1 | 3/2005 | Mages |
| 2005/0245213 A1 | 11/2005 | Hirano et al. |
| 2005/0289632 A1 | 12/2005 | Brooks |
| 2006/0019611 A1 | 1/2006 | Mages |
| 2007/0105509 A1 | 5/2007 | Muhammad |
| 2008/0128901 A1 | 6/2008 | Zurcher et al. |
| 2008/0227409 A1 | 9/2008 | Chang et al. |
| 2008/0240000 A1 | 10/2008 | Kidd |
| 2008/0261519 A1 | 10/2008 | Demarco et al. |
| 2009/0054008 A1 | 2/2009 | Satou |
| 2009/0121797 A1 | 5/2009 | Karabatsos |
| 2009/0125253 A1 | 5/2009 | Blair et al. |
| 2009/0252252 A1 | 10/2009 | Kim et al. |
| 2009/0253385 A1 * | 10/2009 | Dent .................. H04B 1/0458 455/83 |
| 2009/0289744 A1 | 11/2009 | Miyashiro |
| 2010/0002620 A1 | 1/2010 | Proctor et al. |
| 2010/0084146 A1 | 4/2010 | Roberts |
| 2010/0109771 A1 | 5/2010 | Baik et al. |
| 2010/0127795 A1 | 5/2010 | Bauer et al. |
| 2010/0134700 A1 | 6/2010 | Robert et al. |
| 2010/0148886 A1 | 6/2010 | Inoue et al. |
| 2010/0177917 A1 | 7/2010 | Van Der Werf |
| 2010/0323654 A1 | 12/2010 | Judson et al. |
| 2011/0069644 A1 | 3/2011 | Kim et al. |
| 2011/0080229 A1 | 4/2011 | Kennington |
| 2011/0080856 A1 | 4/2011 | Kenington |
| 2011/0134810 A1 | 6/2011 | Yamamoto et al. |
| 2011/0140803 A1 | 6/2011 | Kim et al. |
| 2011/0227664 A1 | 9/2011 | Wyville |
| 2011/0256857 A1 | 10/2011 | Chen et al. |
| 2012/0007605 A1 | 1/2012 | Benedikt |
| 2012/0063496 A1 | 3/2012 | Giannini et al. |
| 2012/0075069 A1 * | 3/2012 | Dickey .................. H01Q 1/364 340/10.1 |
| 2012/0140860 A1 | 6/2012 | Rimini et al. |
| 2012/0154071 A1 | 6/2012 | Bradley et al. |
| 2012/0161784 A1 | 6/2012 | Benedikt |
| 2012/0163245 A1 | 6/2012 | Tone et al. |
| 2012/0194269 A1 | 8/2012 | Schlager |
| 2012/0201153 A1 | 8/2012 | Bharadia et al. |
| 2012/0201173 A1 | 8/2012 | Jain et al. |
| 2012/0212304 A1 | 8/2012 | Zhang et al. |
| 2012/0230227 A1 | 9/2012 | Weiss |
| 2013/0016634 A1 | 1/2013 | Smiley |
| 2013/0063299 A1 | 3/2013 | Proudkii |
| 2013/0065542 A1 | 3/2013 | Proudkii |
| 2013/0079641 A1 | 3/2013 | Zwirn |
| 2013/0083703 A1 | 4/2013 | Granger-Jones et al. |
| 2013/0109330 A1 | 5/2013 | Sahota et al. |
| 2013/0113576 A1 | 5/2013 | Inoue et al. |
| 2013/0130619 A1 | 5/2013 | Harverson et al. |
| 2013/0154887 A1 | 6/2013 | Hein et al. |
| 2013/0201880 A1 | 8/2013 | Bauder et al. |
| 2013/0201881 A1 | 8/2013 | Bauder et al. |
| 2013/0201882 A1 | 8/2013 | Bauder et al. |
| 2013/0222059 A1 | 8/2013 | Kilambi et al. |
| 2013/0241655 A1 | 9/2013 | Liss et al. |
| 2013/0241669 A1 | 9/2013 | Mikhemar et al. |
| 2013/0242809 A1 | 9/2013 | Tone et al. |
| 2013/0245976 A1 | 9/2013 | Hind |
| 2013/0301488 A1 | 11/2013 | Hong et al. |
| 2013/0321097 A1 | 12/2013 | Khlat et al. |
| 2014/0103946 A1 | 4/2014 | Vanden Bossche |
| 2014/0169236 A1 | 6/2014 | Choi et al. |
| 2014/0194073 A1 | 7/2014 | Wyville et al. |
| 2014/0204808 A1 | 7/2014 | Choi et al. |
| 2014/0376419 A1 | 12/2014 | Goel et al. |
| 2015/0049841 A1 | 2/2015 | Laporte et al. |
| 2015/0118978 A1 | 4/2015 | Khlat |
| 2015/0163044 A1 | 6/2015 | Analui et al. |
| 2015/0236390 A1 | 8/2015 | Analui et al. |
| 2015/0236395 A1 | 8/2015 | Analui et al. |
| 2015/0236842 A1 | 8/2015 | Goel et al. |
| 2016/0050031 A1 | 2/2016 | Hwang et al. |
| 2016/0134325 A1 | 5/2016 | Tageman et al. |
| 2016/0204821 A1 * | 7/2016 | Han ...................... H04B 1/40 455/77 |
| 2016/0211870 A1 * | 7/2016 | Wu ................... H04B 1/0475 |
| 2016/0380706 A1 | 12/2016 | Tanzi et al. |
| 2017/0070368 A1 * | 3/2017 | Mandegaran ..... H04L 25/03019 |

FOREIGN PATENT DOCUMENTS

| | | |
|---|---|---|
| EP | 2733855 A1 | 5/2014 |
| EP | 2814172 A1 | 12/2014 |
| EP | 2960981 A1 | 12/2015 |
| KR | 10-2010-0134324 A | 12/2010 |
| WO | 9515018 A1 | 6/1995 |
| WO | 2014032883 A1 | 3/2014 |

(56) References Cited

FOREIGN PATENT DOCUMENTS

| | | |
|---|---|---|
| WO | 2014133625 A2 | 9/2014 |
| WO | 2015089091 A1 | 6/2015 |
| WO | 2016063108 A1 | 4/2016 |

OTHER PUBLICATIONS

Office Action for U.S. Appl. No. 14/626,572, dated Jul. 15, 2016.
Office Action for U.S. Appl. No. 14/622,627, dated May 20, 2016.
Office Action for U.S. Appl. No. 14/626,572, dated Mar. 31, 2016.
ISR for Application No. PCT/US2016/050466, dated Nov. 29, 2016.
Office Action for U.S. Appl. No. 14/626,572, dated Jul. 29, 2015.
ISR and Written Opinion for PCT Application No. PCT/US2015/016642, dated Jun. 25, 2015.
Hunter et al., "Passive Microwave Receive Filter Networks Using Low-Q Resonators," IEEE Microwave Magazine, pp. 46-53, (2005).
Laforge et al., "Diplexer design implementing highly miniaturized multilayer superconducting hybrids and filters," IEEE Transactions on Applied Superconductivity, pp. 47-54, (2009).
Marcatili et al., "Band-Splitting Filter," Bell System Technical Journal, pp. 197-212, (1961).
Matthaei et al., "Microwave Filters, Impedance-Matching Networks, and Coupling Structures," Chapter 14: Directional, Channel-Separation Filters and Traveling-WAve Ring-Resonators, pp. 843-887, Copyright 1980 Artech House, Inc., Dedham, MA; reprint of edition published by McGraw-Hill Book Company, 1964.
Matthaei et al., "Microwave Filters, Impedance-Matching Networks, and Coupling Structures," Chapter 16: Multiplexer Design, pp. 965-1000, Copyright 1980 Artech House, Inc., Dedham, MA; reprint of edition published by McGraw-Hill Book Company, 1964.
Phudpong et al., "Nonlinear Matched Reflection Mode and stop Filters for Frequency Selective Limiting Applications," Microwave Symposium Conference, IEEE/MTT-S International, pp. 1043-1046, (2007).
ISR and Written Opinion for PCT/US2014/069372, dated Mar. 3, 2015.
ISR and Written Opinion for PCT/US2015/016145, dated May 20, 2015.
ISR and Written Opinion for PCT/US2015/015930, dated May 27, 2015.
Korean International Searching Authority, ISR and Written Opinion for PCT/US2013/074155, dated Sep. 23, 2014.
Kannangara et al., "Analysis of an Adaptive Wideband Duplexer With Double-Loop Cancellation," IEEE Transactions on Vehicular Technology, vol. 56, No. 4, pp. 1761-1982, (2007).
Notice of Allowance for U.S. Appl. No. 14/102,244, dated Jul. 20, 2016.
Office Action for U.S. Appl. No. 14/102,244, dated Sep. 22, 2015.
Office Action for U.S. Appl. No. 14/102,244, dated Jun. 15, 2015.
ISR and Written Opinion for PCT/2016/054646, dated Dec. 29, 2016.

* cited by examiner

RADIO FREQUENCY COMPLEX REFLECTION COEFFICIENT READER

CROSS-REFERENCE TO RELATED APPLICATIONS/INCORPORATION BY REFERENCE

This patent application makes reference to, claims priority to, and claims benefit from U.S. Provisional Application No. 62/235,020, filed on Sep. 30, 2015.

The above-identified application is hereby incorporated herein by reference in its entirety.

FIELD OF THE DISCLOSURE

Certain embodiments of the disclosure relate to electromagnetic components, integrated circuits, and/or wireless communication devices and systems. More specifically, certain embodiments of the disclosure relate to a method and system that use a radio frequency (RF) complex reflection coefficient reader.

BACKGROUND OF THE DISCLOSURE

With the recent explosion of the use of wireless devices, the demand for better performing devices is greater than ever. Cell phones, tablets, or any other wireless devices can perform better by providing more computational power, higher downlink and uplink capacity, and more sensor capabilities, all without compromising battery life.

Battery life is directly related to the power consumption of the wireless device. One of the main power consumers in a wireless device is the power needed to transmit a signal. A power amplifier (PA) amplifies the outgoing signal to a desirable level and sends it to the antenna so that it can be converted to electromagnetic waves.

The problem with all antennas especially in a handheld device is that they do not maintain constant impedance. The antenna characteristics, including its impedance, change as the antenna moves within an environment, gets closer to different objects, etc. The change in the antenna impedance causes a mismatch between the antenna and the PA (or other blocks in the transmit path that interface with the antenna), which results in some of the outgoing signal to bounce back at the antenna. When this happens a portion of the signal is not transmitted. This is wasted energy. To compensate for it, the wireless device may increase the power, which further increases power usage. In a worst case, so much of the signal is bounced back and so little is transmitted to the air that it may lose contact with the base station. A combination of the reflected signal and the ongoing signal may also create an undesired standing wave. This standing wave may damage the circuit components such as the PA.

The antenna mismatch may also have other undesired effects such as the leakage of a portion of the transmit signal to the receive path. This is specifically problematic in communication systems that support simultaneous transmit and receive (STAR) capabilities, full duplex (FD) communications, and radar systems.

Antenna impedance can be extracted from the reflection coefficient. Many conventional approaches measure only the magnitude of the reflection coefficient, for instance, using a power meter and a directional coupler. As such, they do not provide information about the complex antenna impedance.

Some traditional schemes frequency-down-convert the reflected transmitting signals through a directional coupler. However, these schemes consume large chip area and power consumption due to the requirement for additional frequency downconverters (e.g., mixers), local oscillator buffers, and baseband circuitry.

In frequency division duplex (FDD) schemes, another challenge with conventional approaches is limited accuracy in the measurement of the reflection coefficient due to the simultaneous existence of receive and transmit signals.

In addition, existing approaches for measuring a complex reflection coefficient can be cumbersome, inefficient and costly. Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

In an electronic circuit or system, for example, when two ports connect, it is often desirable to make the impedances of both ports match. This is especially true when the circuit operates at high enough speed where the wavelengths become comparable to the circuit paths. If there is a mismatch between the impedances of the two ports, a portion of the signal may be reflected. Sometimes the amount of reflection is so large that it is not acceptable.

Impedance mismatch can be problematic in wireless devices, for example, since the impedance of the antenna changes due to unpredictable environmental factors. As a wireless device moves in an environment and as it nears different objects, its effective antenna impedance often changes and can be far from the nominal impedance it was designed for. An impedance mismatch between two ports can be represented by a reflection coefficient which is a complex number having an amplitude and a phase.

Some embodiments of the disclosure determine the reflection coefficient of a circuit component or a circuit. For instance, some embodiments enable the determination of the impedance mismatch by finding the reflection coefficient. This information may be used in a system for various reasons including possible correction of the unwanted impedance mismatch. Some embodiments determine the complex value of the reflection coefficient including both the amplitude and the phase of the reflection coefficient. Reflection coefficient with a complex value representation provides more information compared with reflection coefficient with only amplitude representation.

Some embodiments of the disclosure can provide better performance in wireless devices, for example. Some embodiments can provide a circuit that isolates the transmit signal from the receive signal and can further improve the uplink and downlink capacity. Some embodiments can help improve battery life by aiding an antenna tuner.

Some embodiments of the disclosure mitigate the loss from antenna mismatch by using an antenna tuner. The antenna tuner improves the match between the PA and the antenna. Generally, the antenna tuner is provided information about the antenna mismatch. Some embodiments provide for the acquisition of the complex antenna impedance which includes a real and an imaginary part (e.g., a magnitude and a phase). Antenna impedance can be extracted from the reflection coefficient.

Some embodiments can help antenna tuners by measuring (e.g., continuously, periodically, aperiodically, conditionally, etc.) the complex reflection coefficient of the antenna or any part of the circuit in which it is placed. Some embodiments enable measuring the complex reflection coefficient (e.g., impedance) of any circuit component or network. Some embodiments do not use frequency downconverters.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

DETAILED DESCRIPTION OF THE DISCLOSURE

As utilized herein the terms "circuit" and "circuitry" refer to physical electronic components (i.e. hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Figure 1:
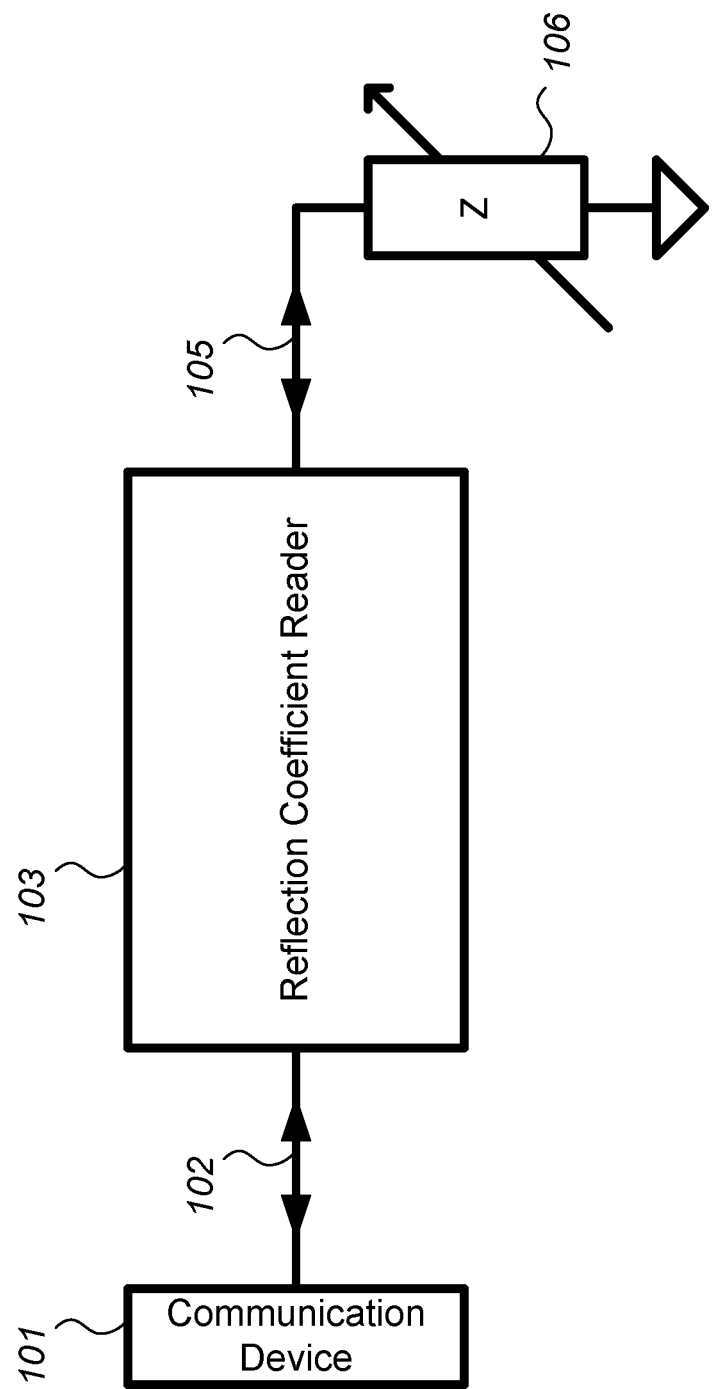
FIG. 1 illustrates a reflection coefficient reader in a system.

FIG. 1 illustrates an embodiment of a reflection coefficient reader in a system according to the present disclosure. Without the reflection coefficient reader 103, the communication device 101 would be connected directly to the variable impedance 106, and thus paths 102 and 105 would be one path. As the impedance of the variable impedance 106 changes, there is an impedance mismatch between the communication device 101 and the variable impedance 106 which causes a reflection coefficient from the point of view of the communication device 101. The reflection coefficient reader 103, as shown in FIG. 1, reads the reflection coefficient reflection caused by the variable impedance 106. Variable impedance 106 may represent an actual circuit or an effective impedance of an electromagnetic device such as an antenna.

Figure 2:
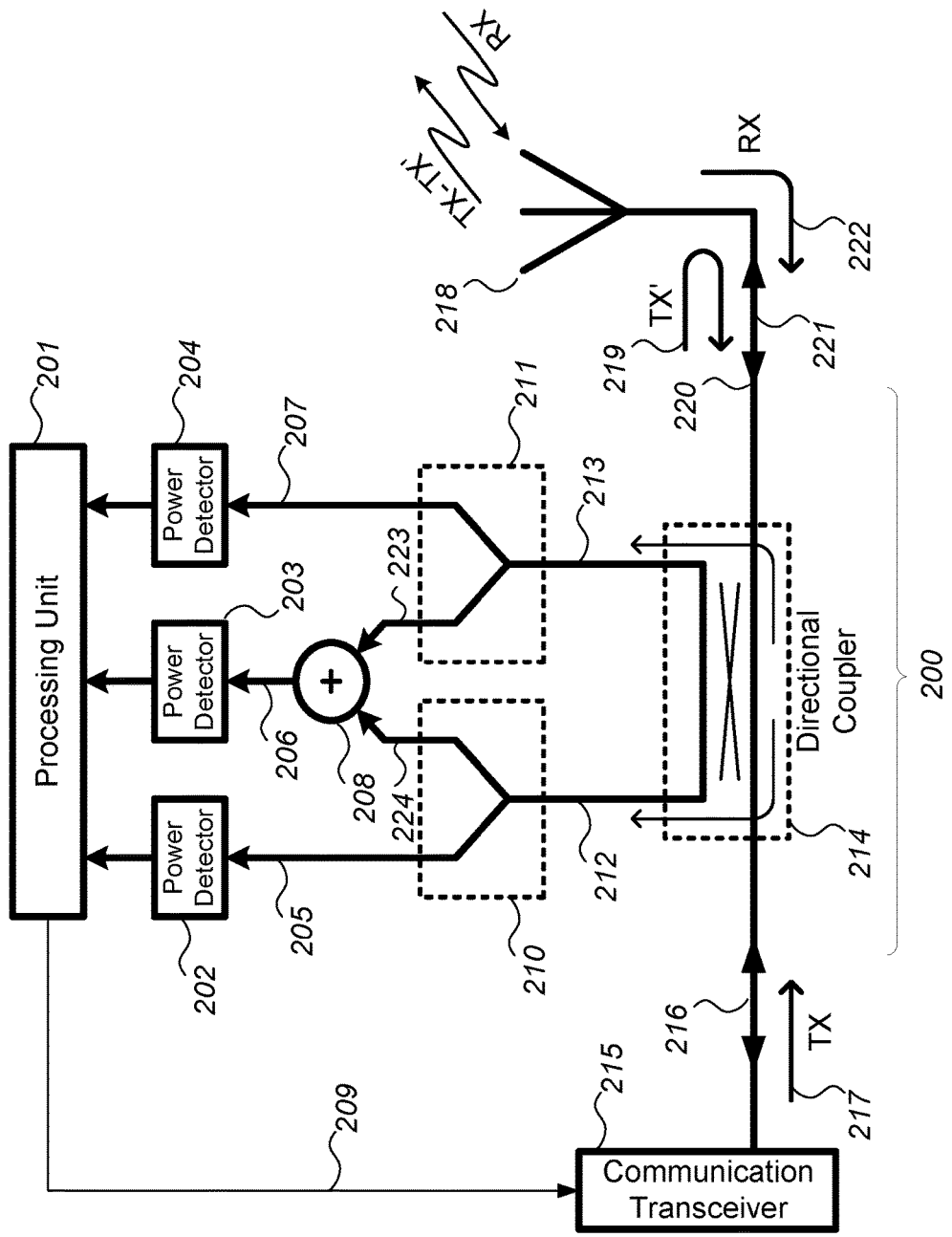
FIG. 2 illustrates a simplified block diagram of the reflection coefficient reader.

FIG. 2 illustrates an embodiment of the present disclosure where a reflection coefficient reader 200 is placed between a communication transceiver 215 and an antenna 218 whose impedance may vary. A wireless communication device, such as a cell phone, Wi-Fi device, etc., has the communication transceiver 215 connected directly to an antenna 218 that is shared for transmitting and receiving functions. In this configuration, a transmit signal TX 217 is sent out of the communication transceiver 215 and to the antenna 218. If the antenna 218 is a perfect impedance match with the communication transceiver 215, all of the signal TX 217 will be transmitted to air. Meanwhile, the antenna 218 picks up incoming signal RX 222, which is directed to the communication transceiver 215. Depending on the standard or communication scheme, transmit and receive waveforms may coexist at the same time or at the same frequency band or both. In the real world, the antenna 218 rarely presents a perfect or even a good impedance match to the communication transceiver. This happens due to changes in the environment. An example is a cell phone moving through a room. As the cell phone nears or passes by different objects in a room, or as it is located at different positions and distances relative to the user, the characteristic of the cell phone antenna changes which, in return, affects the impedance the antenna presents to the rest of the cell phone circuitry. The change in the antenna's characteristic causes an impedance mismatch between the antenna 218 and the circuit that connects to the antenna 218 which, in turn, causes some of the transmit signal to reflect at the antenna 218 and return to the communication transceiver 215. The amount of the transmit signal that is reflected is determined by the reflection coefficient Γ of the antenna. Reflected signals can cause a myriad of problems including, for example, wasted power as some or much of the TX signal 217 is never transmitted to the air; the creation of standing waves at the antenna-transceiver interface that may harm the transceiver; and the desensitization of the receiver.

FIG. 2 illustrates some of the circuitry and operations of the reflection coefficient reader 200 according to an embodiment of the present disclosure. A tapped directional coupler 214 picks up a portion of the outgoing and incoming signals. Because of the nature of directional couplers, the portion of the outgoing signal (mainly TX) is sent to path 213 and the portion of the incoming signal 220 (the receive signal RX 222 and the reflected signal TX' 219) is sent to path 212. The reflected signal TX' 219 is the portion of the TX signal 217 that is reflected by the antenna 218 due to impedance mismatch which is represented by reflection coefficient Γ. Both paths 212 and 213 are split into two using splitters such as power splitters 210 and 211. One path 207 from the power splitter 211 goes to a dedicated detector such as a power detector 204 (first detector). One path 205 from the power splitter 210 goes to a dedicated detector such as a power detector 202 (second detector). Another path 223 from the power splitter 211 and another path 224 from the power splitter 210 go to a signal combiner or adder 208 and subsequently to a third dedicated power detector 203. In an example embodiment, the signal combiner 208 may be a power combiner. The results (outputs) from the power detectors 202, 203, and 204 are sent to a processing unit (or processor) 201 that determines the magnitude and the phase of the reflection coefficient (complex reflection coefficient) and the processing unit 201 sends this determined information to a communication transceiver 215. In an example embodiment, the processing unit 201 may be embedded within the communication transceiver 215. The processing unit 201 may be a digital signal processor (DSP), for example. Power detector outputs, if analog signals, may be converted to digital signals prior to processing. In an example embodiment, the reflection coefficient reader 200 in FIG. 2 can determine the magnitude of the reflection coefficient and the phase (e.g., angle) of the reflection coefficient, but, in some embodiments, it does not determine the sign of the phase. For some applications, this is sufficient and the actual sign of the phase is not used. Furthermore, the sign of the phase can be determined by other methods.

In an example embodiment, one or more of the dedicated detectors 202, 203, 204 may be a voltage detector or a current detector.

Figure 3:
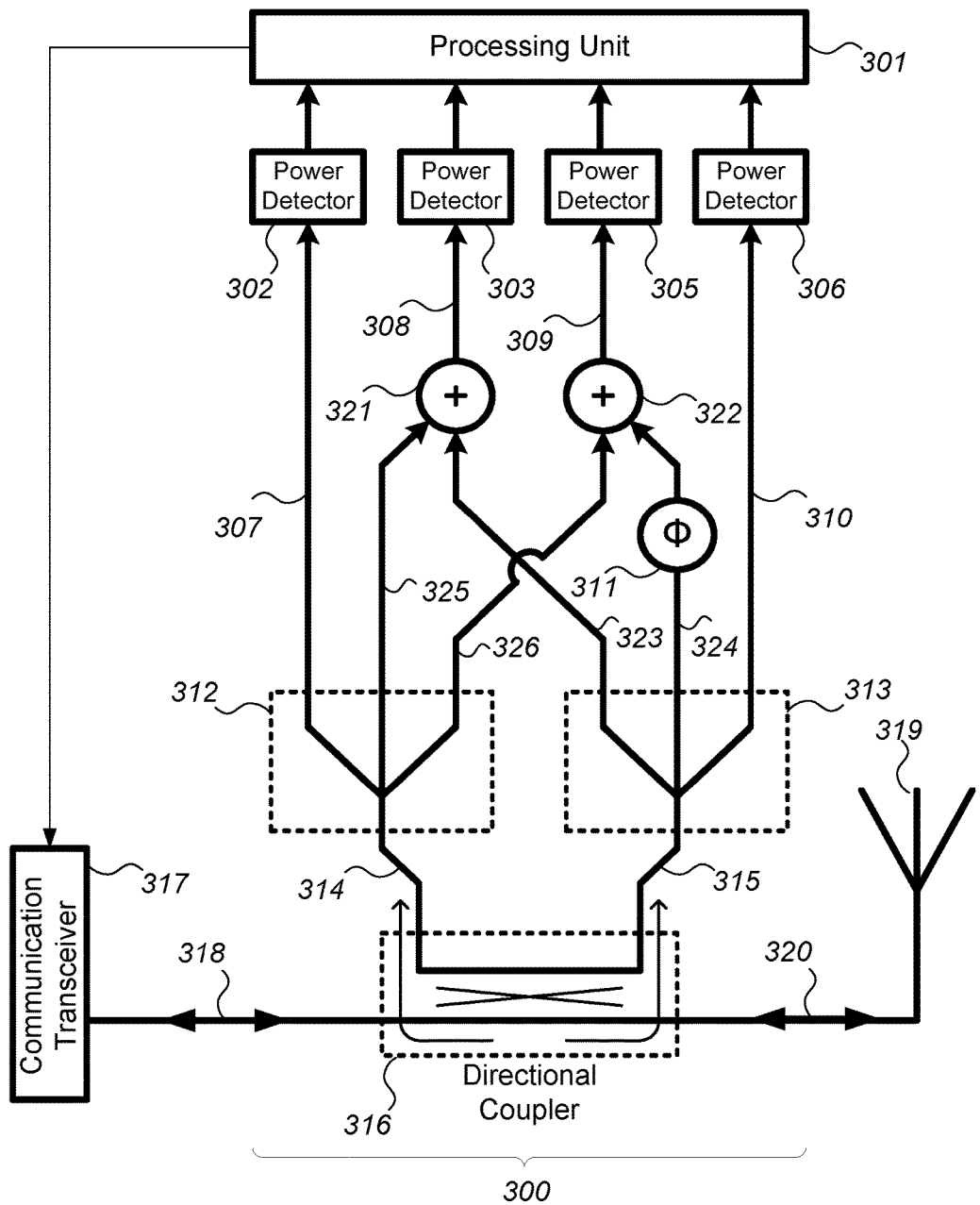
FIG. 3 illustrates a simplified block diagram of the reflection coefficient reader.

FIG. 3 illustrates an embodiment of the present disclosure where a reflection coefficient reader 300 is placed between a communication transceiver 317 and an antenna 319 whose impedance may vary. This configuration illustrated in FIG. 3 not only determines the magnitude and the phase of the reflection coefficient, but it also determines the sign of the phase. The outgoing and the incoming signals are picked up by a tapped directional coupler 316. An outgoing portion 315 is sent to a first splitter such as a power splitter 313 which splits the signal into three signals 310, 323, 324. An incoming portion 314 of the signal is sent to a second splitter such as a power splitter 312 which splits the signal into three signals 307, 325, 326. One output 310 from the power splitter 313 is sent to a dedicated detector such as a power detector 306 (first detector). One output 307 from the power splitter 312 is sent to a dedicated detector such as a power detector 302 (second detector). Another output 323 from the power splitter 313 and another output 325 from the power splitter 312 are sent to a first signal combiner or adder 321. The output 308 of the adder 321 is sent to a dedicated detector such as a power detector 303 (third detector). The one remaining output 326 from the power splitter 312 is sent to a second signal combiner or adder 322 while the remaining output 324 from the other power splitter 313 is sent first through a phase-shifter 311, then to the second adder 322. The output 309 of the adder 322 is sent to a dedicated detector such as a power detector 305 (fourth detector). In an example embodiment, each of the signal combiners 321, 322 may be a power combiner. The outputs of all the power detectors 302, 303, 305, and 306 are sent to a processing unit 301 that determines the magnitude and the phase of the reflection coefficient (complex reflection coefficient) and sends this determined information to a communication transceiver 317. In an example embodiment, the processing unit 301 may be embedded within the communication transceiver 317. The processing unit 301 may be a digital signal processor (DSP), for example. Power detector outputs, if analog signals, may be converted to digital signals prior to processing.

In an example embodiment, one or more of the dedicated detectors 302, 303, 305, 306 may be a voltage detector or a current detector.

Figure 4:
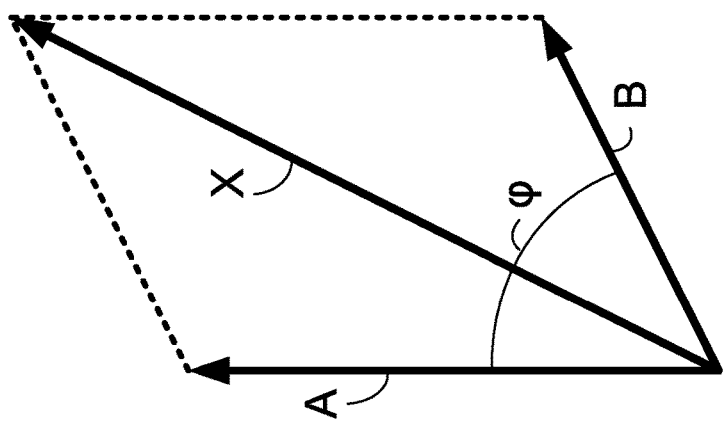
FIG. 4 illustrates example vectors in action.

FIG. 4 illustrates an exemplary embodiment of a graphical representation 400 of how the processing unit 201 may determine the magnitude and the phase of the reflection coefficient in the configuration shown in FIG. 2. The outgoing signal is represented by vector A and the incoming signal is represented by vector B. Because only the relative phase of the two vectors is useful, we can place vector A vertically and show vector B with respect to vector A. Assuming the same coupling ratios in the directional coupler 214, the ratio of the magnitudes of vector B and vector A determines the magnitude of reflection coefficient. The angle φ between vectors A and B determines the phase of the reflection coefficient. The power detector 202 measures the amplitude of vector B shown as |B|. The power detector 204 measures the amplitude of vector A shown as |A|. Power detector 203 determines the magnitude of vector X, the vector sum of vectors A and B, shown as |X|. The processing unit 201 may determine the angle φ (e.g., phase) of the reflection coefficient using the following formula:

$$\phi = \pm \cos^{-1}((|X|^2 - |A|^2 - |B|^2)/(2|A||B|)). \quad (1)$$

Figure 5:
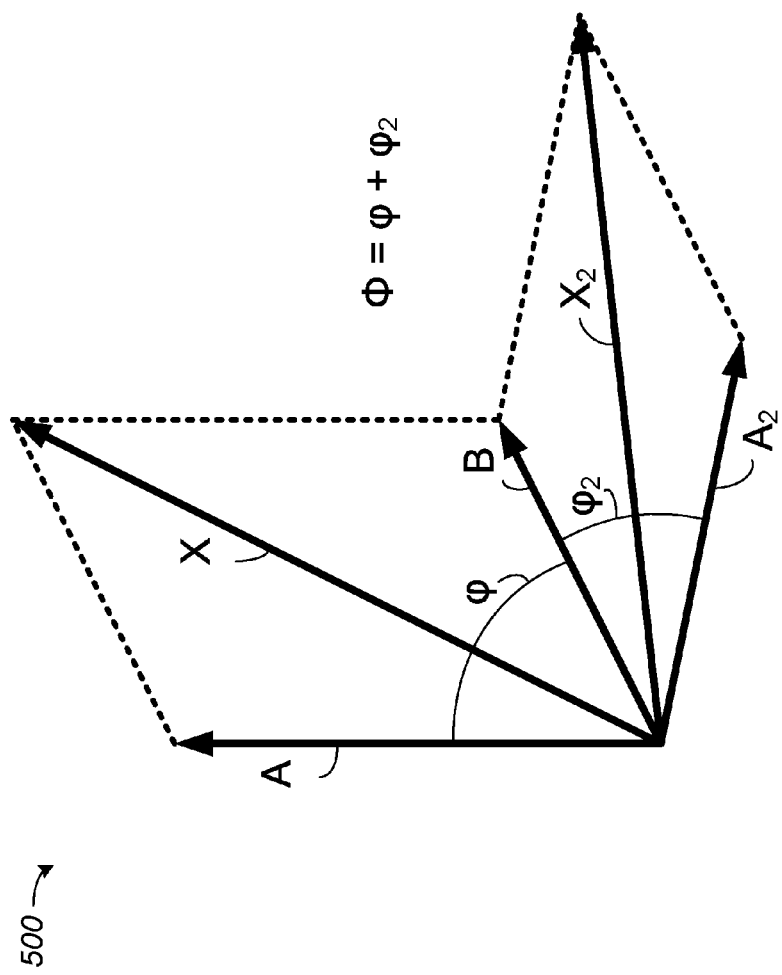
FIG. 5 illustrates example vectors in action.

FIG. 5 illustrates an exemplary embodiment of a graphical representation 500 of how the processing unit 301 may determine the magnitude and the phase of the reflection coefficient in the configuration shown in FIG. 3. The outgoing signal is represented by vector A and the incoming signal is represented by vector B. Because only the relative phase of the two vectors is useful, we can place vector A vertically and show vector B with respect to vector A. Assuming the same coupling ratios in the directional coupler 316, the ratio of the magnitudes of vector B and vector A determines the magnitude of reflection coefficient. The angle φ between vectors A and B determines the phase of the reflection coefficient, but not its sign. Vector $A_2$ represents the output of the phase shifter 311. The power detector 302 measures the amplitude of vector B shown as |B|. The power detector 306 measures the amplitude of vector A shown as |A|. Power detector 303 determines the magnitude of vector X, the vector sum of vectors A and B, shown as |X|. Power detector 305 determines the magnitude of vector $X_2$, the vector sum of vectors $A_2$ and B, shown as $|X_2|$. After the amplitudes of the four vectors are normalized, the processing unit 301 may determine the angles φ and $\phi_2$ using the following formulas:

$$\phi = \pm \cos^{-1}((|X|^2 - |A|^2 - |B|^2)/(2|A||B|)), \quad (2)$$

$$\phi_2 = \pm \cos^{-1}((|X_2|^2 - |A_2|^2 - |B|^2)/(2|A_2||B|)). \quad (3)$$

The processing unit 301 may then determine the sign of φ knowing the following must hold:

$$\Phi = \phi - \phi_2, \quad (4)$$

where Φ is the phase of the phase-shifter 311.

As shown in FIG. 4 and FIG. 5, both magnitude and the phase of the reflection coefficient can be determined by a single directional coupler and a few radio frequency detectors such as power detectors according to some embodiments of the present disclosure. Thus, some embodiments do not need frequency downconverters, local oscillators, high-speed data converters, etc. for this purpose. The determination of the sign of the reflection coefficient shown in FIG. 5, through the phase shifter 311, the combiner 322 and the power detector 305, may be performed through other methods. Exemplary schemes as shown in FIG. 4 and FIG. 5, specifically using the directional coupler, the combiners, and the power detectors, for example, may be passive without consuming DC power. Furthermore, with proper design, the effect of the reflection coefficient reader on the performance of the communication system as indicated by, for example, the signal path insertion loss, can be very low.

Figure 6:
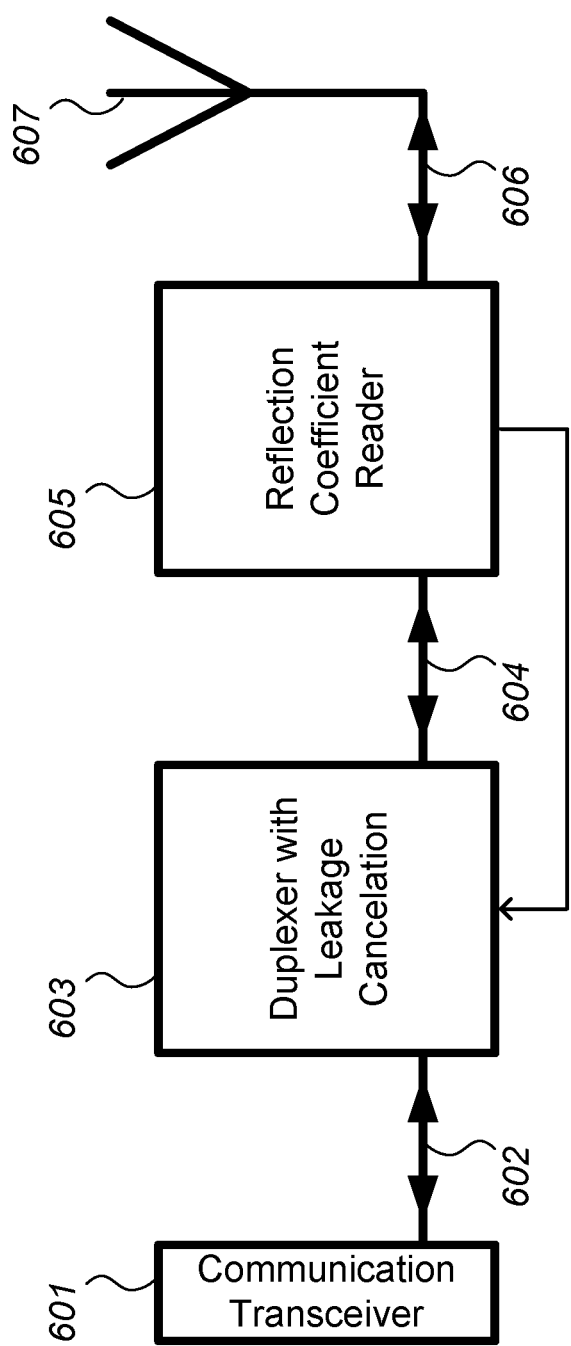
FIG. 6 illustrates one possible use of the reflection coefficient reader.

FIG. 6 illustrates an exemplary use of the reflection coefficient reader according to the present disclosure. The information from a reflection coefficient reader 605 can be used by a duplexer with leakage cancelation circuit 603 to provide optimal cancelation of the reflected TX signal in an FDD communication scheme. The duplexer with leakage cancellation 603 may use passive components in a feed-forward or feed-back configuration to enhance the TX-RX isolation. The reflection coefficient reader 605 may be substantially the same as the reflection coefficient reader 200 in FIG. 2 or the reflection coefficient reader 300 in FIG. 3, for example. Similarly, the reflection coefficient reader 605 may be used in a multiplexer with leakage cancellation or isolation enhancement.

Figure 7:
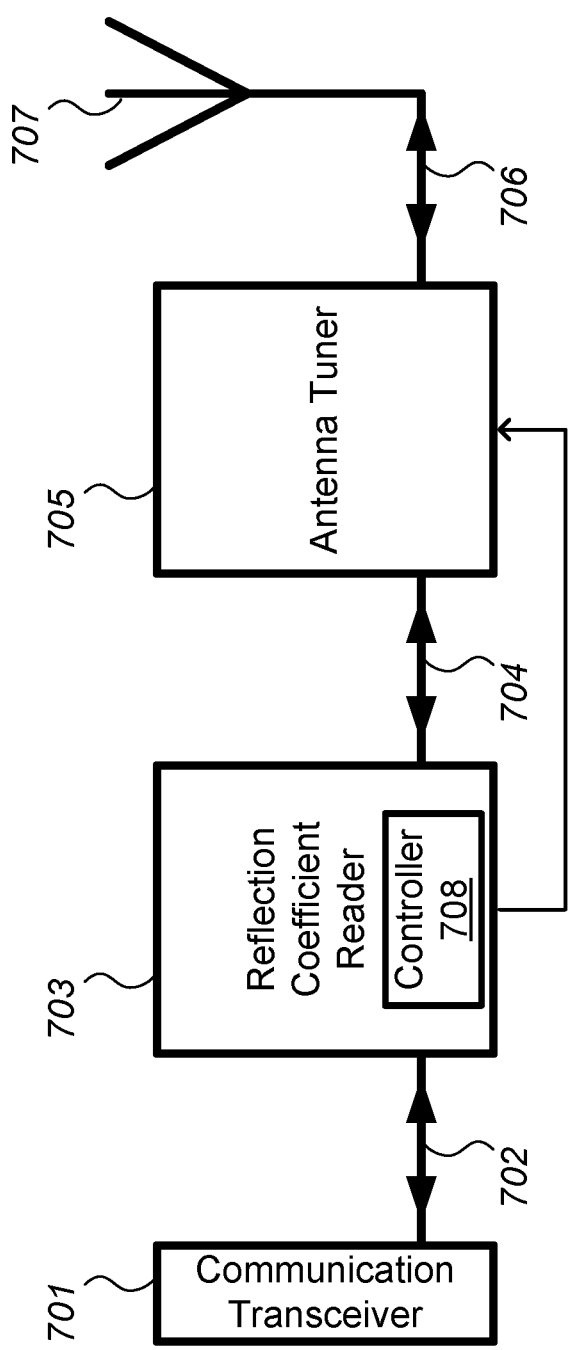
FIG. 7 illustrates another possible use of the reflection coefficient reader.

FIG. 7 illustrates another exemplary use of the reflection coefficient reader according to the present disclosure. A reflection coefficient reader 703 can be placed between a communication transceiver 701 and an antenna tuner 705. The reflection coefficient reader 703 may be utilized to determine settings of the antenna tuner 705, for example. The antenna tuner 705 can use the information from the reflection coefficient reader 703 to improve the impedance matching between the communication transceiver 701 and the antenna tuner 705. The reflection coefficient reader 703 may be substantially the same as the reflection coefficient reader 200 in FIG. 2 or the reflection coefficient reader 300 in FIG. 3, for example. In this exemplary configuration, a controller 708 of the reflection coefficient reader 703 can be programmed slightly differently to achieve a good impedance match between the communication transceiver 701 and the antenna tuner 705. So when the antenna tuner 705 has found a good impedance match, the reflection coefficient reader 703 should not be able to find a reflection coefficient, or in other words, the reflection coefficient $\Gamma = 0$. This is the optimal point. When the impedance of the antenna changes, the exemplary configuration of the antenna tuner 705 no longer provides a good impedance match between points 702 and 704. At this time, the reflection coefficient reader 703 can sense and find a reflection coefficient, which the antenna tuner 705 can use to tune to a new point to achieve a good impedance match between the antenna 707 and the communication transceiver 701. The same or similar exemplary scheme may be applied to a radar system, for example. In other embodiments, the antenna tuner 705 may be placed between an antenna and other device to enhance the impedance matching between them.

Figure 8:
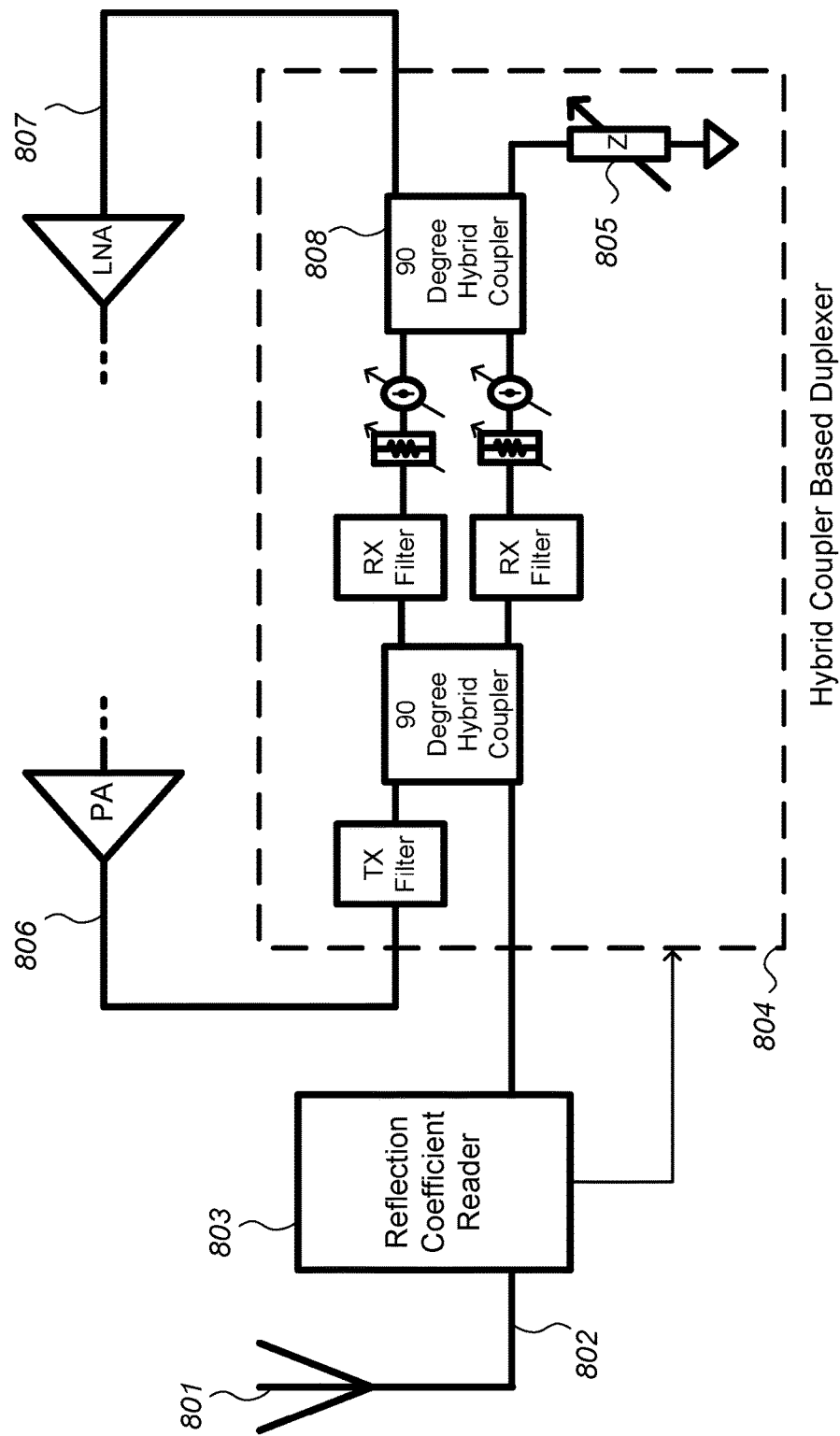
FIG. 8 illustrates another possible use of the reflection coefficient reader.

FIG. 8 illustrates another exemplary use of the reflection coefficient reader according to the present disclosure. A reflection coefficient reader, such as the reflection coefficient reader 803 may be utilized to determine settings of a circuitry that is used to improve isolation between ports of an RF duplexer or an RF multiplexer. A wireless device may use a hybrid coupler based duplexer 804, for example. In this case, the hybrid coupler 808 may use a variable impedance 805 to improve the isolation between transmit signal 806 and receive signal 807. The optimal impedance for the variable impedance 805 is directly related to the impedance of the antenna 801, which can be deduced from the reflection coefficient reader 803. The reflection coefficient reader 803 may be substantially the same as the reflection coefficient reader 200 in FIG. 2 or the reflection coefficient reader 300 in FIG. 3, for example.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for an RF complex reflection coefficient reader.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A radio frequency (RF) circuitry, comprising:
a device configured to tap a transmission line and to pick up some of the electromagnetic signals traveling in both directions on the transmission line; and
a first detector configured to measure a power of a first portion of the tapped electromagnetic signal travelling in one direction on the transmission line;
a second detector configured to measure a power of a first portion of the tapped electromagnetic signal travelling in the other direction on the transmission line;
a third detector configured to measure a power of a first combined signal that comprises a second portion of the tapped electromagnetic signal travelling in the one direction on the transmission line and a second portion of the tapped electromagnetic signal travelling in the other direction of the transmission line;
a fourth detector configured to measure a power of a second combined signal that comprises a phase-shifted third portion of the tapped electromagnetic signal travelling in the one direction on the transmission line and a third portion of the tapped electromagnetic signal travelling in the other direction of the transmission line; and
a processor configured to determine, based on outputs from the first detector, the second detector, the third detector and the fourth detector, a relative magnitude and a relative phase of the electromagnetic signals that travel in different directions on the transmission lines.

2. The RF circuitry of claim 1, wherein the processor is configured to determine a complex value of an impedance that is connected to one side of the transmission line.

3. The RF circuitry of claim 1, wherein the device comprises a directional coupler.

4. The RF circuitry of claim 1, comprising:
a first signal combiner configured to generate the first combined signal; and
a second signal combiner configured to generate the second combined signal is generated by a second signal combiner.

5. The RF circuitry of claim 4, wherein one or more of the first signal combiner and the second signal combiner comprise one or more power combiners.

6. The RF circuitry of claim 1, wherein one or more of the first detector, the second detector, the third detector, and the fourth detector include one or more power detectors.

7. The RF circuitry of claim 1, wherein the processor includes a digital signal processor.

8. The RF circuitry of claim 1, wherein the RF circuitry is utilized in a radar system.

9. The RF circuitry of claim 1, wherein the RF circuitry is utilized to determine settings of an antenna tuner.

10. The RF circuitry of claim 1, wherein the RF circuitry is utilized to determine settings of a circuitry that is used to improve isolation between ports of an RF duplexer or an RF multiplexer.

* * * * *